United States Patent [19]
Adams

[11] 3,901,344
[45] Aug. 26, 1975

[54] VEHICLE STEERING SYSTEM

[75] Inventor: Frederick John Adams, Campton, England

[73] Assignee: Cam Gears Limited, Kitchin, England

[22] Filed: Jan. 29, 1974

[21] Appl. No.: 437,670

[30] Foreign Application Priority Data
Feb. 13, 1973 United Kingdom............... 7086/73

[52] U.S. Cl................. 180/79.2 R; 74/498; 280/96
[51] Int. Cl........................... B62d 3/12; B62d 5/06
[58] Field of Search............... 180/79.2 F, 79.2 R; 280/96; 74/498

[56] References Cited
UNITED STATES PATENTS

| | | | |
|---|---|---|---|
| 1,238,732 | 9/1917 | Andrews | 280/96 |
| 2,334,328 | 11/1943 | Hvid | 180/79.2 R |
| 3,449,981 | 6/1969 | Price | 280/96 X |

FOREIGN PATENTS OR APPLICATIONS

| | | | |
|---|---|---|---|
| 1,341,375 | 9/1963 | France | 180/79.2 F |
| 1,178,453 | 1/1970 | United Kingdom | 280/96 |
| 1,169,391 | 5/1969 | United Kingdom | 180/79.2 R |
| 1,197,908 | 7/1970 | United Kingdom | 180/79.2 F |

*Primary Examiner*—David Schonberg
*Assistant Examiner*—John A. Pekar

[57] ABSTRACT

A vehicle steering system comprises a pinion connected for rotation with a steering column. The pinion meshingly engages with a toothed sector gear member supported for rotation about an axis. A steering linkage for effecting movement of the steerable wheels of the vehicle includes a first member pivotally connected to the sector at a predetermined distance from the axis of rotation of the sector, and a second member connected to the first member and movable by the first member with a substantially translational motion in response to rotation of the sector.

8 Claims, 4 Drawing Figures

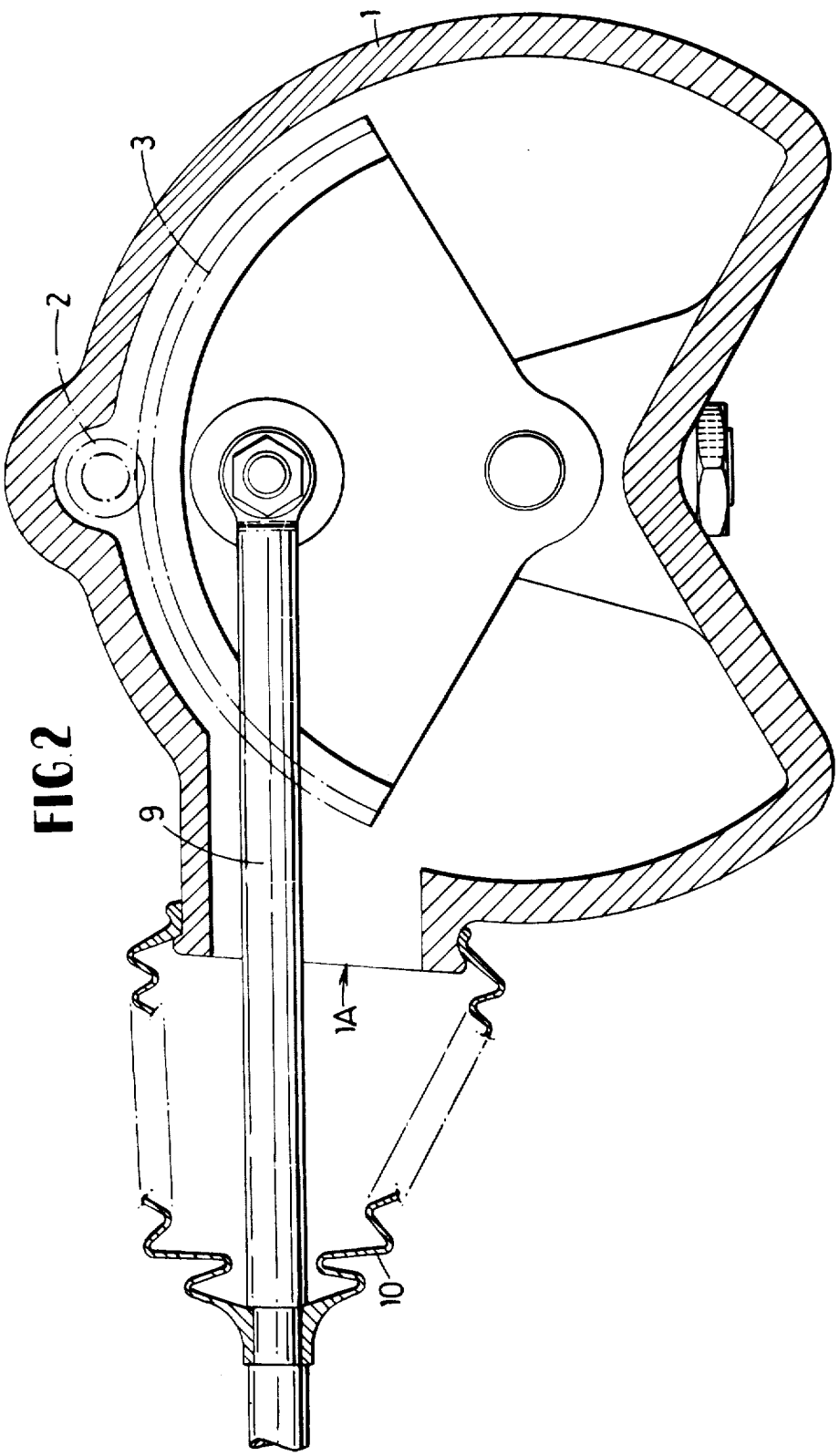

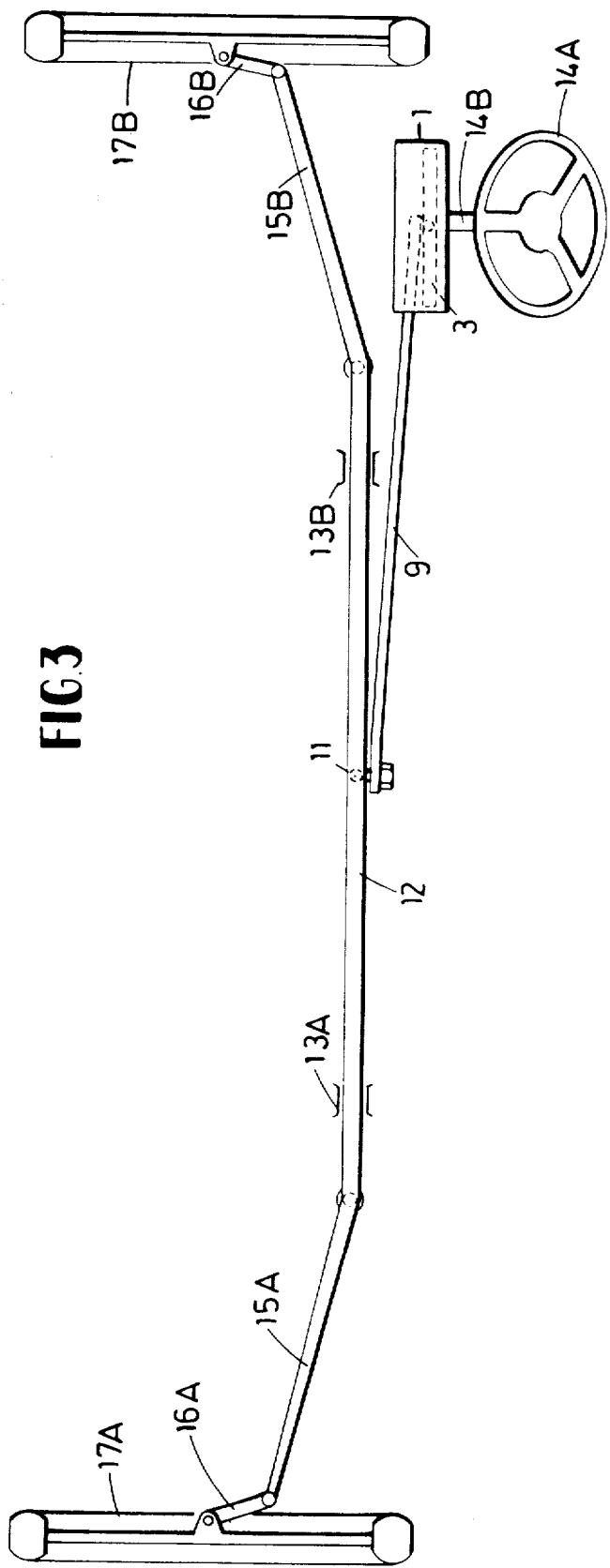

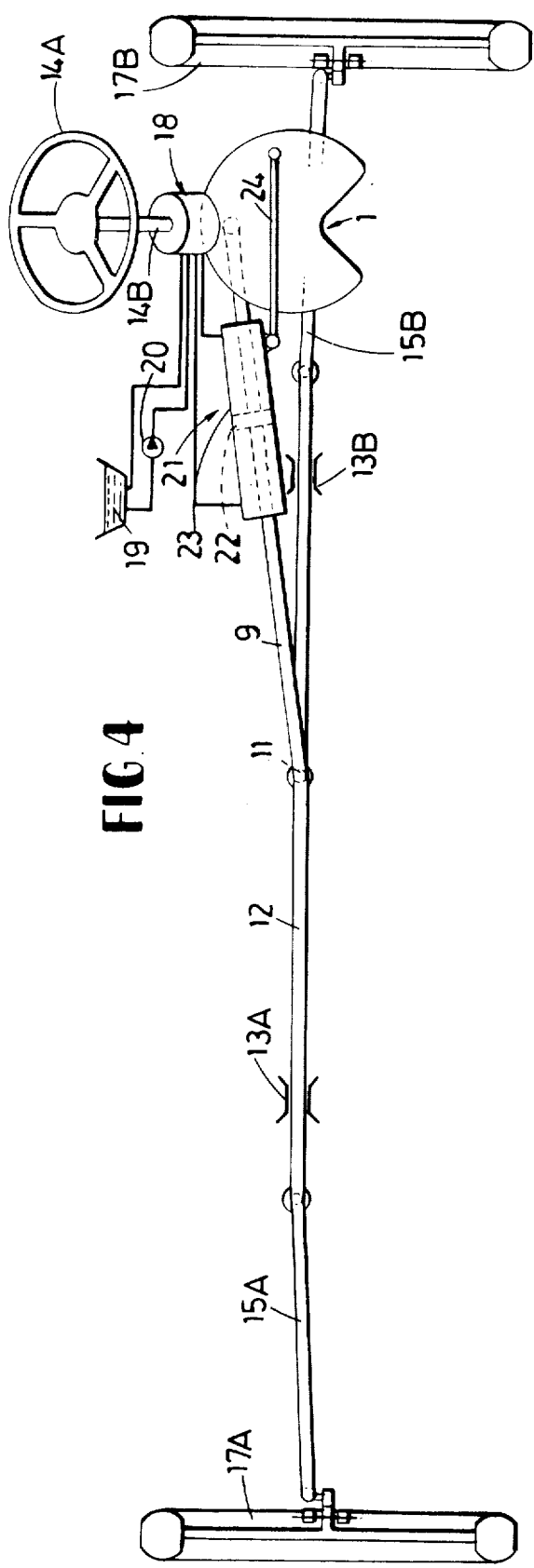

VEHICLE STEERING SYSTEM

This invention concerns a vehicle steering system, and it particularly seeks to provide an alternative to the conventional rack and pinion-type of steering system.

In rack and pinion systems a pinion is rotated by a steering column by virtue of a driver turning a steering wheel attached to the column, such rotation imparting translational motion to a toothed rack bar in mesh with the pinion, and the rack being connected to a suitable steering linkage to control the movement of steerable road wheels. Such systems have been practised for many years and afford a simple and effective solution to the problem of steering control in vehicles. However, such systems are not very flexible as regards disposition of parts; for example, the axis of the pinion, and therefore of the steering column, must intersect the span of the translational member (i.e., the rack bar). Thus, in certain applications, space requirements make it difficult to reconcile the inclusion within a vehicle of a rack and pinion steering system. Another disadvantage of rack and pinion systems is the limited range of possible overall steering ratios that can be attained with any given steering linkage, the dictating factor in this respect being the size of pinion that can be incorporated.

It is thus an aim of the present invention to provide a steering system which can include a steering linkage similar to that used in rack and pinion systems, but alleviating the problems described above.

Accordingly, the invention resides in a vehicle steering system comprising a pinion borne for rotation by a steering column, a toothed sector engaged by the pinion and borne for rotation thereby, and a steering linkage for effecting movement of steerable road wheels, the steering linkage including a first member pivotally connected to the sector at some chosen radius from the axis of rotation of the sector and arranged to impart substantially translational motion to a subsequent member in the steering linkage in response to rotation of the sector.

Thus, by virtue of the connection afforded by said first member of the steering linkage, it is possible to arrange for the steering gear and column to be situated a substantial distance away from the translational member which functionally corresponds to the rack back in a rack and pinion system. Another advantage of the present invention is that a wide range of steering ratios can be obtained by changing the sector size and its degree of travel, and also by changing the radius at which the aforesaid first member is connected to the sector.

In one particular embodiment of the invention, the pinion and sector are each borne for rotation within a steering box, said first member of the steering linkage extending out of the steering box through an aperture therein and pivotally connected to a slidable track rod, with further articulated linkage connected to each end of the track rod to impart angular motion to a pair of steerable road wheels.

There may be provision for adjusting the meshing of the pinion and sector, for example, by housing the bearings of the latter in slidable sleeves which are adjustable as to their position under the action of spring-loaded screws.

The steering system according to the present invention is readily adaptable for hydraulic power assistance, as will be appreciated from the following particular description of an example of the invention, reference being made to the accompanying drawings in which:

FIGS. 1 and 2 illustrate a pinion and sector gear and the first member of a steering linkage used in a steering system according to the invention;

FIG. 3 illustrates schematically the entire steering system, and

FIG. 4 illustrates schematically a power-assisted adaptation of the system of FIG. 3.

Figure 1:
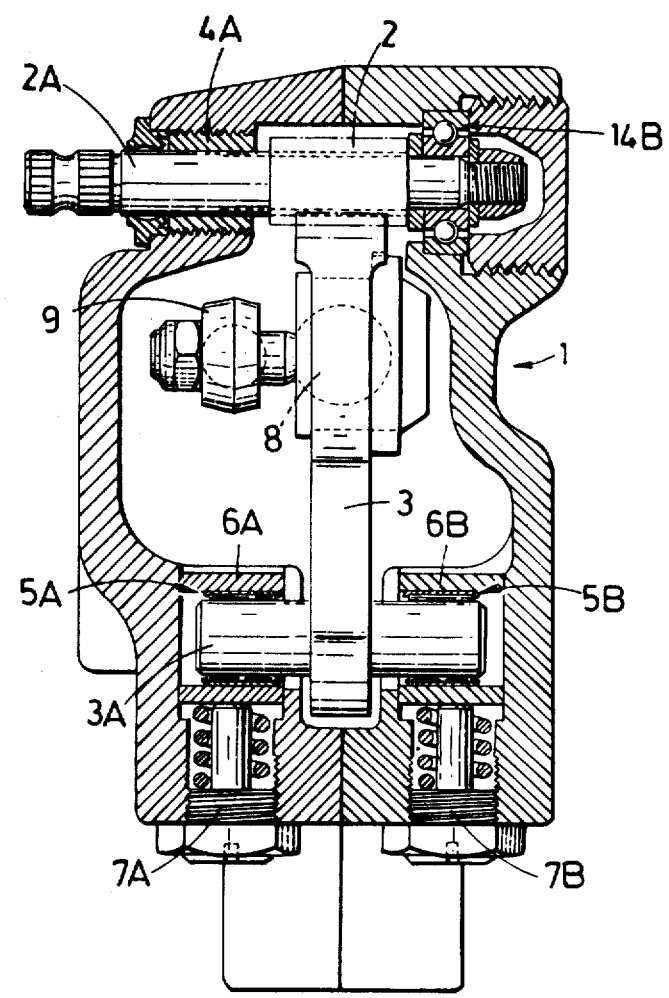

Referring first to FIGS. 1 and 2, there is illustrated a pinion and sector steering gear of the same general type as that illustrated in FIG. 1 of British Pat. Ser. No. 1,169,391 comprising a steering box 1 housing a pinion 2 and toothed sector 3 in engagement therewith. Pinion 2 is fast on a shaft 2A borne for rotation in bearings 4A, 4B, and connected to a rotatable steering column (not shown) in the usual manner. Sector 3 is fast on a shaft 3A borne for rotation in needle bearings 5A, 5B which are themselves housed in slidable sleeves 6A, 6B, respectively. The meshing between pinion and sector can be adjusted by means of spring-loaded screws 7A, 7B bearing against the sleeves 6A, 6B, respectively.

Connected to the sector at some chosen radius from its axis of rotation through a ball joint 8 is a transverse rod 9 constituting the first member of a steering linkage described below. The rod 9 extends out of the steering box 1 through an aperture 1A, the box being sealed against the ingress of foreign matter by means of a resilient boot of the like 10.

Turning now to FIG. 3, rod 9 is shown pivotally connected at 11 to the center point of a track rod 12, (although, of course, the connection could be made at any convenient location along the length of the track rod). The track rod is constrained to slide in bushings 13A, 13B rigidly attached to the vehicle body. Thus, as pinion 2 and consequently sector 3 are rotated by virtue of a driver turning the steering wheel 14A mounted on steering column 14B, translational motion is imparted to track rod 12 through the medium of rod 9. This motion is transmitted through the rest of the articulated steering linkage viz tie rods 15A, 15B and wheel levers 16A, 16B to turn the steerable road wheels 17A, 17B. The nature and functioning of the linkage constituted by parts 15A, 15B, 16A, 16B is conventional. The connections established within the steering linkage may, for example, be such as to afford to the road wheels the angular differentiation known as the Ackerman effect.

As previously mentioned, the steering system is readily adaptable for hydraulic power assistance and an exemplary power-assisted form is shown in FIG. 4. Interposed between the steering wheel and pinion is a torque-responsive valve indicated by reference numeral 18. This can be of any known type such as described in Applicant's British Pat. Ser. Nos. 1,034,349 or 1,149,174 (and which disclosures are incorporated herein by reference), these being quoted merely as examples. The valve 18 controls the flow of pressure fluid supplied from a reservoir 19 by, say, a motor-driven pump 20, to either side of a double-acting ram-type servo-motor 21 in accordance with the magnitude and sense of direction of the steering torque experienced, the fluid circuit being entirely conventional.

In FIG. 4 the rod 9 is connected at one end to track rod 12 and the other end of the rod 9 is connected to a sector (not shown) which is similar to the sector of FIGS. 1 through 3. As illustrated, the servomotor 21 is constructed around, and applies its servo-force to, the rod 9, the piston 22 of the servomotor being rigid with the rod, and the reaction forces experienced by the cylinder 23 are transmitted back to a suitable point on the vehicle body by means of a pivoted link 24.

However, it might be found that a servomotor can be more advantageously positioned elsewhere. Thus, for example, a ram-type servomotor may be provided acting on track rod 12, or alternatively a vane-type of servomotor acting on the sector as described in the Applicant's British Pat. Ser. No. 1,169,391 (which disclosure is incorporated herein by reference) may be provided.

The embodiment of the invention in which an exclusive property or privilege is claimed are defined as follows:

1. A vehicle steering system comprising a pinion connected for rotation with a steering column, a toothed sector meshingly engaged by the pinion and supported for rotation thereby about an axis, and a steering linkage for effecting movement of steerable road wheels, said steering linkage including a first member pivotally connected to the sector at a predetermined radial distance from the axis of rotation of the sector, a second member pivotally connected to said first member, means for constraining said second member for substantially translational motion whereby rotation of said sector with said first member connected thereto imparts substantially translational motion to said second member, and means connecting said second member to a pair of steerable road wheels to impart angular motion to said road wheels in response to translational motion of said second member.

2. A vehicle steering system according to claim 1 wherein said pinion and sector are each supported for rotation within a steering box, said first member of the steering linkage extending out of the steering box through an aperture therein, said second member comprising a slidable track rod, and further articulated linkage connected to each end of the track rod to impart angular motion to a pair of steerable road wheels.

3. A vehicle steering system according to claim 2 wherein said aperture is sealed against the ingress of foreign matter by means of a resilient boot or the like.

4. A vehicle steering system according to claim 1 further comprising means for adjusting the meshing engagement of the pinion and sector.

5. A vehicle steering system according to claim 1 further including a hydraulic power-assistance servomotor operatively associated with said steering linkage.

6. A vehicle steering system according to claim 5 wherein said power assistance servomotor comprises a doubleacting servomotor acting upon one of said members of the steering linkage.

7. A vehicle steering system according to claim 5 wherein the supply of pressure fluid to said servomotor is controlled by means of a torque-responsive valve in accordance with the magnitude and sense of direction of steering torque.

8. A vehicle steering system comprising a pinion connected for rotation with a steering column, a toothed sector meshingly engaged by the pinion and supported for rotation thereby about an axis, said sector being supported by bearings and further including slidable sleeves housing said bearings, springloaded screws for adjusting the position of said sleeves for thereby adjusting the meshing engagement of the pinion and sector, and a steering linkage for effective movement of steerable road wheels, the steering linkage including a first member pivotally connected to the sector at a predetermined distance from the axis of rotation of the sector and a second member connected to said first member and movable by said first member with a substantially translational motion in response to rotation of said sector.

* * * * *